Nov. 8, 1927.
R. G. ANDERSON
1,648,470
HOB FOR WORM GEARS
Filed Nov. 20, 1922
2 Sheets-Sheet 1
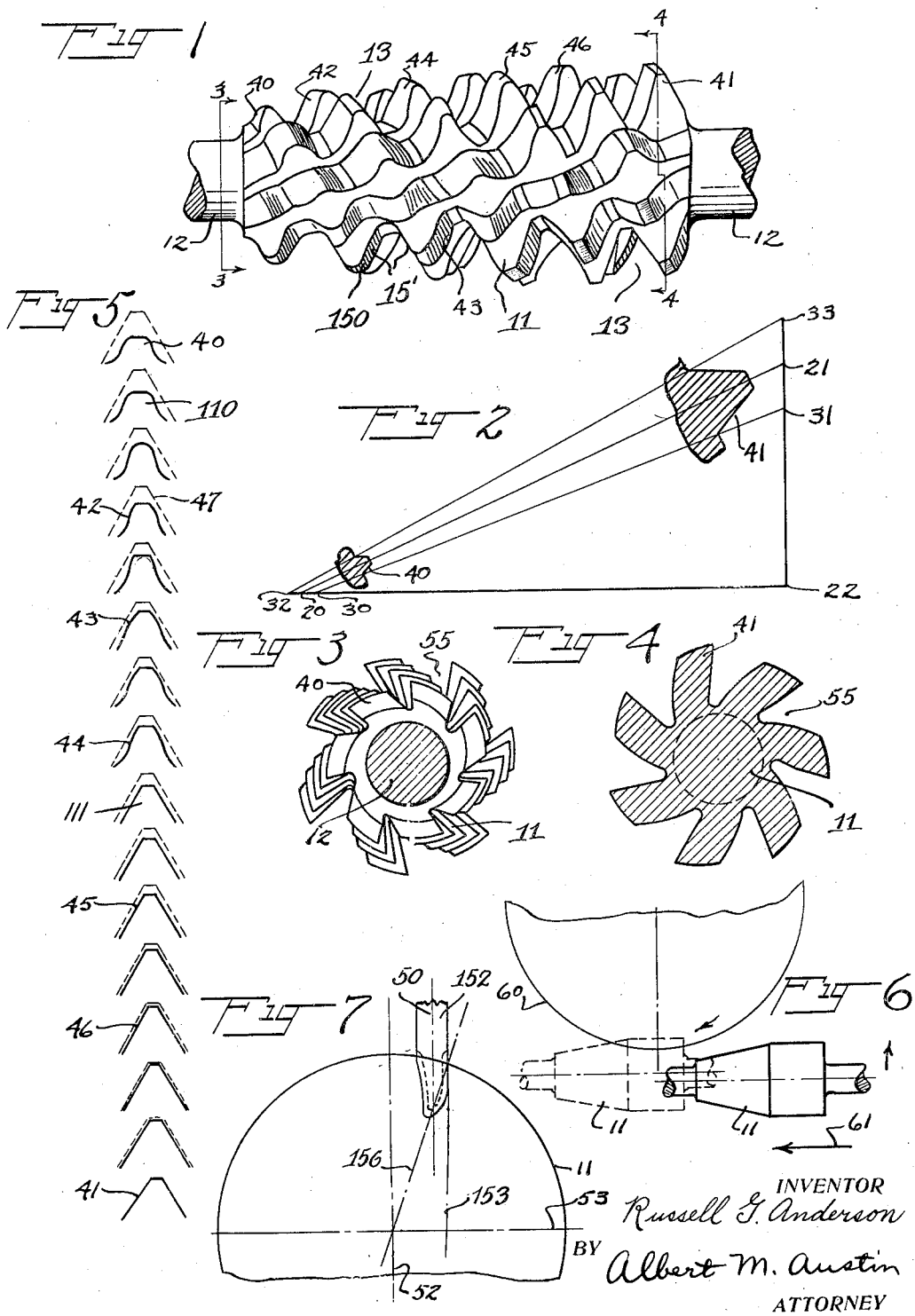

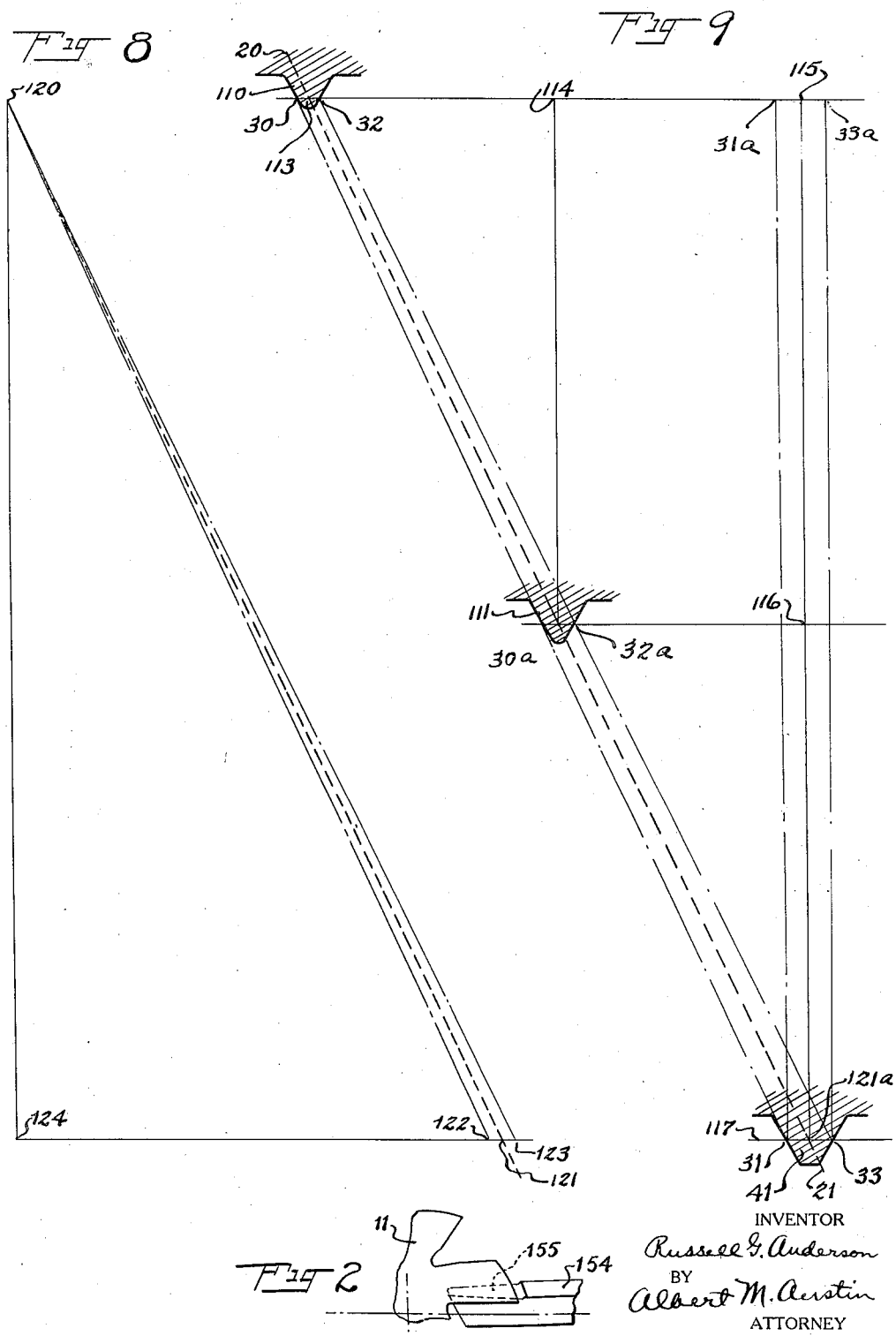

Patented Nov. 8, 1927.

1,648,470

UNITED STATES PATENT OFFICE.

RUSSELL G. ANDERSON, OF LAKEWOOD, OHIO, ASSIGNOR TO THE CLEVELAND WORM AND GEAR COMPANY, OF CLEVELAND, OHIO, A CORPORATION OF OHIO.

HOB FOR WORM GEARS.

Application filed November 20, 1922. Serial No. 601,960.

This invention relates to gear generating tools, or so-called hobs, and more particularly to such tools adapted for generating a gear in a single progressive operation.

Some of the objects of the invention are to provide an improved form of progressively cutting tool; to provide an improved tool adapted to be operated at high speed; to provide a tool which will form gears of improved accuracy; to provide a tool having a polishing tooth; to provide a tool having cutting teeth arranged in rows of peculiar form; to provide a tool having teeth arranged in helical intersecting rows; to provide a tool having teeth of progressively increasing height.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Figure 1 is a side view of a gear cutting tool embodying features of the invention;

Figure 2 is a fragmentary view of hob tooth and relieving tool.

Figures 3 and 4 are sectional views taken on the lines 3—3 and 4—4, respectively, of Figure 1;

Figure 5 shows the variation in size and form of the teeth along the thread helix, reference being made to a tooth at the larger end of the tool for comparison;

Figure 6 shows the tool in position to cooperate with a blank to cut and form the blank into a gear wheel;

Figure 7 shows diagrammatically the relation of fluting tool to the axis of the hob when removing metal to form hob teeth faces.

Figure 8 shows parallel lines to those developed in Figure 9 and shows relative helix leads; and Figure 9 shows diagrammatically the hob helix and the helical paths of tools which furnish hob teeth developed into a plane from a cylindrical form.

Referring to the illustrative embodiment selected for the purpose of showing one way in which the present invention may be practiced, Figure 1 shows a gear generating tool or hob comprising a body portion 11 integral with a suitable shaft 12, 12, by means of which the tool may be driven. The cutting teeth with their respective cutting faces are formed by the helical grooves of a predetermined variable profile having a lead which is a constant. The direction of lead of the helix is the same as that of the gear which the hob is to work upon, that is if the gear to be cut is right hand the said helix is necessarily of a right hand. The said groove will therefore be designated hereinafter as the thread groove. To form the cutting faces parallel helical grooves 55 intercept the thread grooves, at distances dependent upon the pitch of the hob, which helix is of the opposite hand to the thread groove helix and therefore the two grooves intersect to form the desired cutting teeth.

As previously mentioned herein a constant increment of tooth thickness as measured on the pitch line forms an important feature of this invention. There are no two teeth contained between any two fluting grooves which are of equal dimensions when measured on the pitch line, it being unnecessary to have several finishing teeth of the same dimension because of the feature of the rubbing or burnishing function of the last tooth which imparts to the work a much finer or more highly polished finished tooth than that which could be obtained by a finishing cut.

To obtain the aforesaid hob tooth form a roughing cut is first made to form a helical thread groove of the desired lead which leaves sufficient stock for properly finishing. This operation produces an over size helical thread having a constant lead which is shown in Figures 8 and 9 when developed into a flat surface to have a lead indicated by the dotted line 120—121 and 20—21.

Figure 9 shows also the lead of the finishing tools which form the sides of the hob teeth, and is a developed diagrammatic view of 2 pitch circumferences of the hob, and their respective thread leads. The lead for 1 pitch circumference of the hob from tooth 110 to tooth 111 is indicated by the line 113—114. The lead indicated for the next pitch circumference between teeth 111 and 41 is indicated by 114 and 115. The pitch circumference is shown by 115—116 which is equal in length to 116—117. These leads constitute the lead of the hob and are equal for every pitch circumference and predetermined by the gear which the hob is to generate.

To produce an equal increment in the thickness of the teeth when measured on the pitch line the sides of the hob teeth are finished to produce helix leads which are of different constants. On one side of the tooth the lead 30—30ᵃ and 30ᵃ—31 is less than the hob lead and less than the lead 32—32ᵃ and 32ᵃ—33 as used for the opposite face which is in turn of a greater constant lead than the hob lead which is clearly shown by the Figure 9, producing as shown in Figure 8, a line 120—124 equal to 2 pitch circumferences and a line 124—122 equal to 2 leads for one side of the hob teeth when measured on the pitch line and a line 124—123 equal to 2 leads of the opposite side of the hob tooth when measured on the pitch line. It can be clearly shown, since 120—121 bisects the acute angle 122—120—123, that the sides of the hob teeth are finished to produce teeth which increase uniformly in tooth thickness when measured on the pitch line and which also maintain the correct constant lead for the hob.

The triangles formed by the helix lead 30—31ᵃ and pitch circumference 31ᵃ—31 is equal to the triangle 120—122—124 and the triangle formed by the helix lead 32—33ᵃ and the pitch circumference 33ᵃ—33 is equal to 120—123—124. By superimposing the triangles as shown in Figure 8 the relative helix leads and their respective lengths (the hypotenuses of the triangles) are easily compared.

It is understood that the cutting tool is guided along the curved lines formed by hypotenuses 30—31 and 32—33 when the respective triangles are wrapped around cylinders having diameters corresponding to the respective pitch circumference. The top of the threads are then removed an amount so as to progressively reduce the size as the lead lines converge. The amount of this reduction depends upon the individual characteristics of the gear which it is desired to form.

There is thus produced a helical thread of constantly varying cross section. For example, the section 110 shown in Figs. 5 and 9 is smaller than the cross section 111, also shown in Figs. 5 and 9, and this cross section is smaller than the cross section 41 also shown in Figures 5 and 9. The section 41 is that of a tooth to the right of the tooth section 111 which in turn is to the right of tooth section 110, when looking at the hob as shown in Fig. 1. Between the teeth 110 and 41 are other teeth of a varying cross section as shown diagrammatically in Figure 5, and the rate of increment is shown clearly in Figure 9. The tooth 41 is a finishing tooth which is produced by a reverse relieve of the cutting edge by oilstoning the same after grinding. The result obtained is that this finishing tooth instead of having cutting action has a rubbing tendency which causes the tooth produced on the blank to have a highly polished surface.

The faces of the hob teeth are then formed by the fluting cutter 50 which is of a conventional design and fed across the hob to form helical cuts having a long lead so that the cutting faces of the hob teeth are substantially normal to the thread centres except for the rake. Fluting the hob with the cutter shown in Figure 7 positioned so that a line passing through the hob teeth face 200 does not intersect the hob axis, shown by intersecting lines 52—53, produces the positive rake and teeth with a cross section as shown in Figure 4.

The longitudinal grooves or flutes each form a helical path around the hob, and thus the sides of the teeth cut by these grooves are warped planes. Upon the intersections of these grooves with the thread helix, there are produced warped or helicoidal tooth faces, and an important feature of hobs constructed in accordance with my invention is that no part of these helicoidal faces shall have a negative rake.

The teeth of the hob are then relieved on their cutting edges, the relieving tool being raised slightly off center, see Figure 2, where relieving tool 154 has the cutting face 155 positioned above the axis of the hob, so as to maintain the predetermined desired tooth form. The teeth are relieved in a manner similar to that employed for the manufacture of commercial hobs which maintains a tooth cross section for the life of the tool equal to that which it had upon its completion and when first used. This is accomplished in a relieving lathe in the customary way familiar to those skilled in the art. On the tooth 41 of largest size, that is, at the finishing end of the hob, a reversed relief may be obtained by oilstoning the cutting edge slightly after grinding. Thus a highly polished surface is produced on the gear by the tooth 41, and any tendency to tear is effectually minimized.

In the operation of cutting a gear with the hob described, a blank 60 (Figure 6) is mounted in a gear generating machine. The hob is fed in the direction as shown by the vertical arrow (Figure 6) before or at the same time as fed in the direction of the arrow 61, until a predetermined relation exists between the axial lines of the blank 60 and the hob 11 in accordance with the size of the gear which it is desired to cut. The hob 11 is shown in full lines at the start of the operation. The blank 60 and hob 11 are rotated in co-related movement by suitable differential gearing (not shown), and the hob 11 is moved forward into contact with the blank, in the direction indicated by arrow 61 until a predetermined relation exists between the axial lines of the blank 60 and the hob 11 in accordance with the size of gear which it is desired to cut. It will be noted that in feeding the generating tool or hob 11 as described, the metal is removed from the gear blank 60 progressively due to the increasing size of the teeth in the generating tool when fed in the direction indicated by the arrow 61, and that all teeth on the blank 60 are cut to desired form. The final tooth 41, which was treated by means of an oilstone, produces the final finish or high polish, as the right-hand end of the hob (Figure 6) passes the vertical plane of the center line of the gear blank 60.

Thus it will be seen that I have provided a gear generating tool or hob for producing finished gears in one operation, which may be operated at relatively high speed, and which produces gears of predetermined dimensions with extremely great accuracy. The gear teeth are formed by a continuous rotary movement of the cutting tool and blank, and thus gear teeth of great smoothness are generated, such gears being exceedingly quiet and free from undesirable "chattering" or vibration.

While I have shown and described and have pointed out in the annexed claim certain novel features of my invention, it will be understood that various omissions, substitutions and changes in the form and details of the device illustrated and in its operation may be made by those skilled in the art without departing from the spirit of my invention.

Having thus described my invention, I claim:

A gear generating hob having a plurality of teeth arranged along a helical pitch line and progressively varying in size from the larger to the smaller end, the surfaces defined by the side cutting edges of said teeth intersecting the surface of the pitch cylinder in helical lines, the lead angle of one of said second helical lines being greater than the lead angle of said helical pitch line, the lead angle of the other of said second helical lines being less than the lead angle of said helical pitch line, said second helical lines converging to intersect said helical pitch line at a predetermined point.

Signed at Cleveland in the county of Cuyahoga and State of Ohio this thirteenth day of Nov. A. D. 1922.

RUSSELL G. ANDERSON.